United States Patent Office 3,668,014
Patented June 6, 1972

3,668,014
ELECTRODE AND METHOD OF PRODUCING SAME
Emanuel G. Katsoulis, Long Island City, and William S. Pryor, Roslyn Estates, N.Y., assignor to Leesona Corporation, Warwick, R.I.
No Drawing. Filed June 10, 1968, Ser. No. 735,581
Int. Cl. H01m 35/00
U.S. Cl. 136—120                    10 Claims

ABSTRACT OF THE DISCLOSURE

A mat of polyfluorocarbon fibers having controlled pore size and hydrophobicity is impregnated with a catalytic substance to form a light-weight catalytic mass having a low, uniform loading of the catalytic substance. This catalytic mass, particularly when combined with an electrically-conducting element, and/or a continuous hydrophobic polymer membrane is suitable for use as an electrode in an electrochemical cell, e.g. as a fuel or oxidant electrode in a fuel cell or as the cathode in a metal-air battery, wherein it provides high current densities at relatively constant voltages over a long period of time.

FIELD OF THE INVENTION

This invention relates to electrochemical cells wherein a catalytic surface is needed to provide means for rendering a gas or a liquid sufficiently active to engage in an oxidation or reduction half-reaction with an electrolyte. More particularly, this invention relates to electrochemical cells such as fuel cells, metal-air batteries and the like wherein the gas or liqud is in contact with an electrolyte and an unconsumable electrode comprising an electrically-conductive catalytic mass. In the case of a metal-air cell, the catalytic mass activates the oxygen of the air oxidant. In the case of a fuel cell, a catalytic mass is needed to activate both fuel and oxidant. The invention is directed to an improved method for making the catalytic mass; to electrodes incorporating the catalytic mass made by this improved method, and to electrochemical cells employing the electrodes.

DESCRIPTION OF THE PRIOR ART

Several approaches to the problem of formulating a catalytic electrode for use in electrochemical cells already exist. Electrodes employing low activity catalysts such as carbon have been in use for many years. These electrodes give satisfactory performance when the current drain is low, but are incapable of providing high current densities for any significant period of time. Various high activity catalysts, e.g. gold, silver and the six metals of the platinum group of the Periodic Table, have been extensively experimented with, but it has proved very difficult to keep the cost of these catalysts within commercially feasible bounds. Generally, it has proved advantageous from the standpoint of controlling the reaction interface of reactant/solid electrode and electrolyte to employ mixtures of a catalyst and a hydrophobic polymer, such as polytetrafluoroethylene (PTFE), or a membrane of hydrophobic polymer adjacent to and in contact with the mixture of catalyst and hydrophobic polymer. Moreover, such structures are both lighter in weight and less expensive in comparison to the pure metal electrodes, since a relatively small amount of catalytic metal is needed to provide a large, active catalytic surface in contact with the electrolyte and the reactant. Several factors are quite critical in the case of these light-weight electrodes. First, the amount of catalyst loading must be high enough to provide a performance equal to that of the pure catalyst, e.g. equal to platinum sponge or Raney nickel membranes. Second, the metal-polymer mass should be as resistant to poisoning as a pure metal electrode. Third, the composition of the catalytic mass should be as uniform as possible, so that a given area of the mass will have predictable, predetermined performance characteristics. Fourth, the electrode must maintain an accurate control of the reaction interface. It has proved very difficult to fabricate electrodes with good quality control which satisfy all of these requirements.

OBJECTS OF THE INVENTION

Accordingly, it is an object of this invention to provide improved methods for fabricating electrodes comprising an electrically-conductive mass of an electrocatalyst and a hydrophobic polymer.

A further object of this invention is to provide methods of fabricating light-weight catalytic electrodes having uniform pore size and catalyst loading, controlled hydrophobic characteristics, and predictable performance characteristics.

A further object of this invention is to simplify the fabrication of a catalyst-impregnated matrix.

Still another object of this invention is to provide a light-weight, unconsumed catalytic electrode of high performance characteristics which has a relatively low loading of catalyst and which maintains its performance characteristics for a long period of time.

A still further object of this invention is to provide a relatively inexpensive, quality-controlled, catalyst-impregnated matrix suitable for use in an electrode of an electrochemical cell.

SUMMARY OF THE INVENTION

The foregoing objects of this invention are achieved by introducing an activated catalytic metal into a fibrous polyhalohydrocarbon matrix and disposing of the resulting matrix in an electrode of an electrochemical cell. The catalytic metal may be introduced as a powder in a suspending medium or as a dissolved compound in which the metal is present as a cation or as part of an anion, e.g. a metal salt or a salt or acid or a cyano- or halo-metal group, or the like. The dispersion may be filtered through or sprayed onto the matrix such that the powder deposits on the fibers. The salt or acid solution containing the metal in cationic or anionic form is permitted to set the matrix, and is then reduced to the metal such that colloidal metal precipitates out onto the fibers. The fibrous mat comprises a resinous hydrophobic material, which, as has been pointed out, is selected from one of the polyhalohydrocarbons known in the art, e.g. polytetrafluoroethylene (PTFE). An excellent commercially available PTFE fibrous mat with controlled, uniform pore size and controlled aqueous wettability (hydrohobic/hydrophilic) characteristics is manufactured by Chemplast, Inc. of East Newark, N.J., under the trade name of "Zitex." A "Zitex" matrix is made by precipitating a polyhalohydrocarbon dispersion of a type known in the prior art onto a loose slurry of oppositely charged cellulose fibers. The polyhalohydrocarbon-coated cellulosic fibers are then, after various optional treating and shaping steps, dried and heated to the sintering temperature of the halohydrocarbon polymer, causing both the formation of a fibrous mat with controlled porosity and the burning out of the cellulosic skeleton. The hydrophobicity of the matrix can be modified by uniformly dispersing a colloidal mineral phase throughout the fiber slurry prior to the precipitation of the hydrophobic polymer dispersion such that the sintered matrix contains a discontinuous, colloidal, wettable mineral phase deposited in the pores and uniformly arranged from major surface to major surface of the matrix. The details of the method of producing a fibrous mat of this type are set forth in a U.S. patent application to Mesiti et al., Ser. No. 543,786, filed Apr. 20, 1966.

The electrocatalyst can be of any of the various materials, including pure elements, alloys, mixtures and oxides which will enhance an electrochemical reaction. However, the preferred electrocatalyst has an atomic weight greater than 55 and is selected from Groups VIII anl I–B of the Mendeleev Periodic Table, more particularly, nickel, cobalt, iron, rhodium, ruthenium, palladium, osmium, iridium, platinum, gold, copper, silver and mixtures or alloys thereof. Of these, platinum is especially active, though quite expensive. Gold, silver, nickel, cobalt and mixtures and alloys thereof are less expensive and also quite active. The amount of catalytic metal introduced into the matrix is controlled by regulating the composition of the suspension of the metal or solution of the metal compound. In the latter instance, i.e. when impregnation and in situ reduction of soluble metallic compounds within the wetted matrix is the method of introducing catalyst, the concentration of dissolved catalytic metal ion determines the catalyst loading. Any of the water-soluble compounds used in the prior art for such purposes, e.g. $KAu(CN)_4$, $HAuCl_4$, $K_2PtCl_6$, $H_2PtCl_6$, $Co(NO_3)_2$ and the like, may be reduced in situ within the fibrous matrix. Reduction to the metal may be by any suitable method, including the heating of unstable salts. According to the present method of impregnation of a suitable matrix with suspensions and solutions, the catalyst loading of the finished electrode can be less than half of what has been customary in the prior art and obtain equivalent results i.e., the catalyst loading will be from 0.5 to 7 mg./cm.$^2$. In the case of platinum, the loadings employed in this invention are less than 4 mg. Pt./cm.$^2$ and may be less than 2 mg. Pt/cm.$^2$. In any event, less than the 10–17 mg. Pt/cm.$^2$ used in the prior art does not result in any sacrifice of electrochemical activity with respect to prior art electrodes. The primary advantage of the present method of constructing electrodes is in the ability to utilize lighter catalyst loadings without sacrificing performance. This apparently is a result of having substantially all of the surface of the catalyst particles available as reaction sites. Moreover, the present method of fabrication is reproducible, improving quality control. Although it is not necessary to employ polymer particles suspended in the catalyst mix as in the prior art processes and still have substantially complete control of the reaction interface, it can be desirable at times to increase the hydrophobicity of the electrode to utilize hydrophobic polymer particles in the suspension of catalytic metal employed as the impregnating agent.

A particularly advantageous structure from the standpoint of structural integrity and the control of the reaction interface is obtainable by bonding or laminating the catalyst-impregnated matrix to a continuous gas permeable liquid impermeable hydrophobic membrane or by applying a coating of hydrophobic polymer to one surface of the matrix. When employed in an electrochemical cell the catalyst-impregnated matrix will be in contact with the electrolyte of the cell and the hydrophobic polymer membrane in contact with the cell reactant such as air or oxygen when the electrode is used as the cathode in an air-depolarized cell. The use of the catalyst-impregnated matrix eliminates the need to admix polymer particles with the catalyst and apply the admixture to the membrane which at times presents quality-control problems. The polymer membrane preferably is a fluorocarbon polymer including polytrifluorochloroethylene, polytetrachloroethylene, polytetrafluoroethylene, polyvinylidenefluoride, the hydrophobic co-polymers of two or more of the above materials, or with acrylonitrile polyethylene or the like and will have a thickness of up to about 10 mils.

Moreover, to improve the current collecting properties of the electrode, it can be desirable to press a conductive metal skeleton, i.e., a screen, wire, net, gauge, mesh or sheet expanded metal or the like, in contact with the catalytic surface of the fluorocarbon polymer matrix. In this way, the current produced at the catalyst surface need only travel to the current collector for removal, rather than the full width and length of the electrode surface. The current collector can be constructed of any porous metal structure such as gold, nickel, titanium, silver, or the like. The current collector must be relatively resistant to the electrolyte employed in the cell and must be a good conductor of electrical current.

The electrodes of this invention may be any desired thickness. Generally, electrodes of less than 10 mils thickness are preferred.

Having described the invention in general terms, the following examples are set forth to more particularly illustrate the invention without in any way limiting its scope.

EXAMPLE I

A platinum-PTFE electrode was fabricated by filtering a water suspension of Pt powder through a fine fibrous PTFE mat with a PTFF density of 0.703 gm./cc. and an average thickness of 4.36 mils. This film is commercially available under the trade name of "Zitex" and is manufactured by Chemplast, as noted above. The Pt-activated matrix was heat treated for two hours at 700° F. (370° C.) and then pressure bonded to a continuous gas permeable and liquid impermeable 3 mil PTFE film. An expanded nickel screen current collector was then pressed onto the activated film. Half cell measurements were taken and results are tabulated below.

| Current (ma.) | Current density (ma./cm.$^2$) | Voltage (volts E*) |
|---|---|---|
| OCV | | 1.065 |
| 15 | 1 | 0.952 |
| 30 | 2 | 0.938 |
| 45 | 3 | 0.931 |
| 60 | 4 | 0.926 |
| 75 | 5 | 0.922 |
| 150 | 10 | 0.909 |
| 300 | 20 | 0.894 |
| 450 | 30 | 0.882 |
| 600 | 40 | 0.872 |
| 750 | 50 | 0.862 |
| 900 | 60 | 0.851 |
| 1,050 | 70 | 0.834 |
| 1,200 | 80 | 0.823 |
| 1,350 | 90 | 0.808 |
| 1,500 | 100 | 0.790 |
| 1,800 | 120 | Polarized |

Characteristics of this half-cell were as follows:

Electrolyte: 30 wt. percent KOH
Temperature: 75° F. (24° C.)
Pt loading: 3.3 mg./cm.$^2$
Oxidant: Ambient air
Ref.: Rev. $H_2$

EXAMPLE II

A zinc-air single cell, incorporating the above cathode, was discharged at a constant current density of 40 ma./cm.$^2$. Results are shown below.

| Time: | Voltage [1] |
|---|---|
| OCV | 1.433 |
| Int ULV | 1.170 |
| 20 min. | 1.183 |
| 40 min. | 1.157 |
| 60 min. | 1.128 |
| 80 min. | 1.125 |
| 100 min. | 1.106 |
| 120 min. | 1.064 |
| 140 min. | 1.033 |
| 150 min. | 1.013 |
| 157 min. | 1.000 |

[1] Average discharge voltage is 1.104 volts.

Characteristics of this cell were as follows:

Electrolyte: 30 wt. percent KOH
Temperature: 75° F. (24° C.)
Total current: 0.6 amps.
Current density: 40 ma./cm.

EXAMPLE III

An alternate method of activation includes the filtration of a dilute suspension of platinum-PTFE instead of platinum alone. A platinum-PTFE suspension with a platinum-PTFE weight ratio of 10.6 was filtered through a fine PTFE mat and the activated mat was treated as in Example I.

RESULTS OF HALF-CELL MEASUREMENTS

| Current (ma.) | Current density (ma./cm.$^2$) | Voltage (volts E*) |
| --- | --- | --- |
| OCV | | 1.152 |
| 15 | 1 | 0.968 |
| 30 | 2 | 0.954 |
| 45 | 3 | 0.946 |
| 60 | 4 | 0.941 |
| 90 | 5 | 0.934 |
| 150 | 6 | 0.926 |
| 300 | 10 | 0.914 |
| 450 | 20 | 0.906 |
| 600 | 30 | 0.901 |
| 900 | 40 | 0.891 |
| 1,200 | 60 | 0.880 |
| 1,500 | 80 | 0.864 |
| 1,800 | 100 | 0.842 |
| 2,000 | 133 | 0.820 |
| 2,250 | 150 | Polarized |

Characteristics of the half-cell of this example were as follows:

Electrolyte: 30 wt. percent KOH
Temperature: 75° F. (24° C.)
Oxidant: Ambient air
Pt loading: 2.3 mg./cm.
Ref.: Rev. $H_2$ An electrode similar to that of Example I in structure and performance can also be made by thoroughly wetting the fibrous PTFE mat of Example I with a 20% aqueous solution of $H_2PtCl_6$ (chlor-platinic acid) containing, as a reducing agent, hydroxylamine hydrochloride in the proportion of one gram $NH_2OH \cdot HCl$ per ten milliliters of solution. The wetted mat, after being dried at a warm temperature, is subjected to a temperature of 325° C. for three minutes to reduce the chlorplatinic acid to an active platinum catalyst. Similarly, a mat wetted with silver oxide in concentrated aqueous ammonium hydroxide can be dried and reduced thermally at 400° C. to form the silver catalyst in situ.

A nickel catalytic mass can be prepared in the following manner: A dispersion of the metal particles is prepared by suspending materials in water employing a minor amount of surfactant. The suspension is sprayed onto one major surface of a PTFE mat similar to the one employed in Example I. The sprayed mat is then lightly dried in a draft furnace at a temperature of 85° C. for a period of ten minutes. The dried mat is then heat-treated in the manner of Example I.

In the above examples, further modifications can be made in the production of the electrodes of the present invention and in their employment in electrochemical cells. Instead of the nickel current collector of Example I, a porous copper, silver, gold, iron, or platinum member can be used. Instead of PTFE, other hydrophobic polymers can be employed in Example III, and generally, any hydrophobic polymer usable in the aforesaid Mesiti et al. process referred to above is suitable for use in this invention. Such polymers include polytrifluorochloroethylene, polytrichloroethylene, polyvinylidene fluoride, polyvinyl fluoride, the hydrophobic copolymers of two or more of the above materials or with acrylonitrile, polyethylene or the like. Various catalytic materials may be used, as has been noted.

As has been set forth above, the electrodes of this invention can be used in a variety of electrochemical cells, such as fuel cells and metal-air cells. These cells may be operated at various temperatures and with various electrolytes, as is known in the art. Among the suitable electrolytes are alkali metal hydroxides, alkanol amines, sulfuric acid, phosphoric acid, and virtually any material which remains invariant under the operating conditions of the cell and which will provide sufficient ionic conductivity. Aqueous solutions of these materials are preferred, either in free-flowing form, or trapped in a matrix. Although the electrodes of this invention have been used illustratively as cathodes, they are also effective as fuel cell anodes. For example, they may be disposed in an electrolyte to serve as both cathode and anode of a hydrogen-oxygen fuel cell. Furthermore, as will be apparent to those skilled in the art, while the invention has been described with reference to cells for the generation of electric current, it is possible to employ the aforesaid electrodes in other electro-chemical devices, such as electrolytic cells. Various modifications and embodiments of the type described above may be made without departing from the scope of this invention. Such embodiments and modifications are to be included within the appended claims.

What is claimed is:

1. Method of making a composite electrode for use in an electrochemical cell for generating electrical energy including the steps of (a) introducing a quantity of from 0.5–7 mg./cm.$^2$ particulate electrocatalytic material uniformly throughout the porosity of a fibrous polyfluorocarbon matrix, said fibrous matrix having been prepared by (1) precipitating a polyhalohydrocarbon dispersion onto a loose slurry of oppositely charged cellulose fibers to form a cellulose fiber-polyhalohydrocarbon mixture, (2) shaping said cellulose fiber-polyhalohydrocarbon mixture, and (3) heating said shaped mixture at an elevated temperature sufficient to burn out said cellulose fibers and provide a matrix with controlled porosity and having a series of integral, interconnecting pores and pre-selected, controlled aqueous wettability characteristics; and (b) heating said electrocatalytic containing fibrous matrix at an elevated temperature sufficient to bond said electrocatalytic material to said matrix whereby said electrocatalytic material is uniformly dispersed throughout the pores of said fibrous polyfluorocarbon matrix.

2. The method of claim 1 including the step of bonding said electrocatalytic containing fibrous matrix to a gas-permeable, hydrophobic backing layer to form said composite electrode.

3. The method according to claim 2 wherein said hydrophobic backing layer comprises a polytetrafluoroethylene membrane.

4. The method according to claim 3 wherein the electrocatalyst is selected from Groups VIII and I-B of the Periodic Table.

5. The method according to claim 1 wherein said matrix has a colloidal mineral phase throughout the fibrous matrix structure.

6. The method according to claim 1 wherein the fibrous matrix is impregnated with an aqueous suspension of electrocatalytic metal particles.

7. The method according to claim 1 wherein the fibrous matrix is first impregnated with a solution comprising a reducible electrocatalyst compound and thereafter reducing said metal compound to the colloidal metal in situ.

8. The method according to claim 2 further including the step of securing a current collector to said fibrous matrix.

9. The method according to claim 1 wherein the average matrix pore size is from about 0.5 to about 10 microns.

10. The electrode of claim 1 disposed in an electrochemical cell for generation of electricity comprising an anode, a cathode and an electrolyte contacting said anode and cathode.

References Cited
UNITED STATES PATENTS

| | | | |
|---|---|---|---|
| 2,837,772 | 6/1958 | Deakin | 18—59 |
| 3,235,473 | 2/1966 | Le Duc | 204—30 |
| 3,297,484 | 1/1967 | Niedrach | 136—86 |

WINSTON A. DOUGLAS, Primary Examiner

H. A. FEELEY, Assistant Examiner